Feb. 15, 1966　　　G. JAYLE ETAL　　　3,235,321
FIELD OF VISION TESTING APPARATUS
Filed April 27, 1962
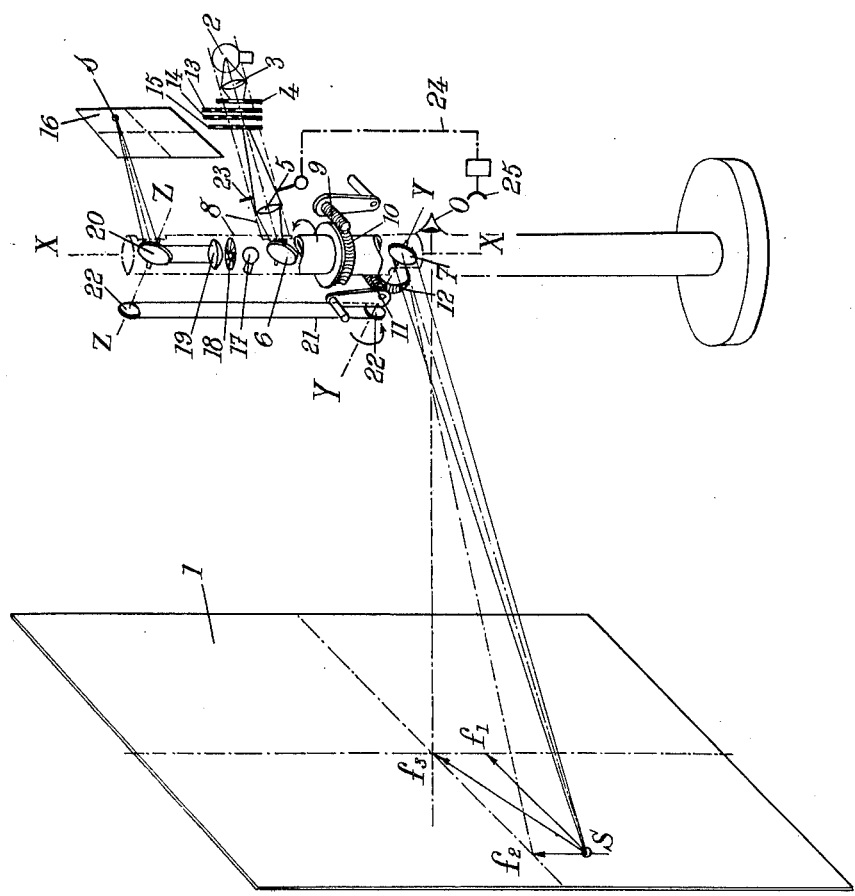

United States Patent Office 3,235,321
Patented Feb. 15, 1966

3,235,321
FIELD OF VISION TESTING APPARATUS
Gaëtan Jayle and Pierre Mossé, 79 Rue du Docteur Escat, Marseille, France, and Jacques Labet, Marseille, France; said Labet assignor to said Jayle and said Mossé
Filed Apr. 27, 1962, Ser. No. 190,689
Claims priority, application France, May 8, 1961, 861,138
1 Claim. (Cl. 351—30)

The present invention relates to ophthalmological apparatus such as campimeters, adaptometers and the like, i.e. to apparatus intended to project a light spot of given dimensions, luminance and colour onto any given point or zone on an observation screen, generally of plane shape, in order to study the visual field of a patient.

The chief object of our invention is to provide an apparatus of this kind which is better adapted to meet the requirements of practice than those known up to this time.

According to our invention, the apparatus comprises, to form the light spot to be projected on the observation screen, an optical system comprising, among other elements, a light source, an optical projection device and a reflecting optical device comprising two mirrors the first of which reflects onto the second one the light beam issuing from said optical projection device whereas the second mirror reflects this beam toward the observation screen, the whole of this optical system being mounted pivotable about an axis which is preferably vertical, whereas the second mirror is pivotable about an axis perpendicular to the first one, whereby it is possible by combining the two pivoting movements by means of suitable controls to displace the light spot at will over the surface of the observation screen.

Other features of our invention will become apparent in the course of the following detailed description of an embodiment thereof, with reference to the appended drawings, given merely by way of example, and in which:

The only figure diagrammatically shows, in perspective view, a campimeter made according to the invention.

The observation screen is shown at 1 and it is desired to project onto said screen a light spot S intended to be observed by the eye O of the patient and some characteristics of which may be modified at will by the ophthalmologist.

The apparatus comprises an optical system including, among other elements, a light source 2, a projection device consisting for instance of a first lens 3, followed by a diaphragm 4, and an objective lens 5, and optical reflecting means 6–7. Said optical reflecting means comprises a first mirror 6 reflecting the beam from the objective lens 5 onto the second mirror 7. Said second mirror 7 in turn reflects the light beam toward observation screen 1. The whole of these elements is mounted on a support 8, shown partly in solid line and partly in dot-and-dash lines, pivotably about an axis XX, preferably vertical as shown by the drawing. This support 8 is rotated about said axis by means of a worm wheel 10 fixed on said support and meshing with a worm 9 itself rotated by means of a crank handle. The second mirror 7 is pivoted about an axis YY perpendicular to axis XX under the action of a worm wheel 11 rigid with mirror 7 and meshing with a worm 11 rotated by means of a crank handle. In the construction shown by the drawing the two control means are independent but of course they might be connected together so as to have a single control member analogous for instance to the joystick of an airplane.

It will be readily understood that with such an optical system it is always possible for the ophthalmologist by suitably operating the two control means, to bring the spot S to any desired place on screen 1. Rotation of support 8 about an axis XX moves the spot horizontally (arrow $f_1$) and rotation of mirror 7 about axis YY moves said spot vertically (arrow $f_2$) so that a combination of these two such movements permits of moving said spot in any desired direction (arrow $f_3$).

It should be noted that it is of interest to have mirror 7 located substantially opposite the center of screen 1, whereas the patient's eye is to be located as close as possible to said mirror 7.

The optical system further comprises, according to another feature of the invention, adjustable optical devices capable of acting upon the beam that produces spot S to modify some characteristics of said spot, said devices being advantageously mounted on revolving suports so that their active elements can be brought across the path of travel of the beam, for instance between diaphragm 4 and objective lens 5.

We may for instance provide the following devices:

A revolving member 13 having holes of different diameters respectively, so that it is possible to modify the dimensions of the light spot S;

A revolving member 14 carrying neutral absorbing screens of known respective optical densities which permit of modifying the luminance of spot S; and A revolving member 15 carrying coloured filters of different colours, which permit of modifying the shade of said spot S.

Furthermore, according to another feature of our invention, we may provide, to cooperate with the optical system producing light spot S, a repetition device which enables the ophthalmologist to know, at any time and without having to look at screen 1, the position of said spot on said screen.

This repetition device comprises, as shown, means for producing a second spot $s$ on an auxiliary screen 16 this auxiliary spot having the same displacements with respect to screen 16 as the main spot S with respect to screen 1.

To obtain this result support 8 carries a light source 17 illuminating a diaphragm 18 behind which is mounted an objective lens 19 which projects a light beam onto a mirror 20 capable of reflecting said beam onto the center of auxiliary screen 16 when the main spot S is itself at the center of the observation screen 1.

This mirror 20 is rotatable about an axis ZZ parallel to axis YY and the movement of rotation of mirror 20 is made dependent upon that of mirror 7, for instance by means of a belt 21 passing around two pulleys 22 of the same diameter respectively fixed on the pivoting spindles of mirrors 7 and 20.

Advantageously, according to still another feature of the invention, in order to eliminate the possibility of errors which might result from possible variations of the brightness of the observed spot S, we provide, across the projection beam of said spot, an adjustable diaphragm 23 which is operated in response to variations of a characteristic of the spot that is projected, in such manner that the brightness of said spot remains substantially constant.

The characteristic of spot S that is used may be:

Either the position of spot S, in which case the control of diaphragm 23 may be obtained mechanically through means operated by movable parts of the projection system;

Or, as shown by the drawing, the brightness of said spot; in this case an electronic control (diagrammatically indicated by the dot-and-dash lines 24) of diaphragm 23 is operated by a brightness detector 25 responsive to variations of the radiation of spot S. Advantageously this detector is arranged in such manner that its photosensitive element is exposed to the action of the spot in the same conditions as the patient's eye.

What we claim is:

An ophthalmological apparatus which comprises, in combination, an observation screen, mounting means fixed with respect to said screen, a support rotatable with respect to said mounting means about a first axis, a first mirror pivotally mounted on said support about a second axis transverse to the first one, a light source carried by said support, optical projecting means carried by said support for forming a light beam of rays from said source, a second mirror carried by said support across the path of travel of said beam and arranged to reflect said beam onto said first mirror, said first mirror being arranged to reflect said beam onto said screen to form a main light spot thereon, control means for rotating said support with respect to said mounting means about said first axis, control means for rotating said first mirror with respect to said support about said second axis, an adjustable diaphragm carried by said support across said light beam, detection means located substantially adjacent the patient's line of sight toward the screen and responsive to variations in brightness of said main light spot for operating said diaphragm to keep the brightness of said spot at a constant value, an auxiliary screen, and repetition means for producing a second light spot on said auxiliary screen and displacing said second light spot with respect to said auxiliary screen substantially in accordance with the displacements of said main light spot with respect to said observation screen, said repetition means comprising a second source of light carried by said support, a third mirror pivotally mounted on said support on an axis transverse to said first axis, and an operative connection between said first mirror and said third mirror for effecting pivotal movements of said third mirror in accordance with pivotal movements of said first mirror, whereby the position of said main light spot on said observation screen will be indicated by the position of said second light spot on said auxiliary screen.

References Cited by the Examiner

UNITED STATES PATENTS

| 947,490 | 1/1910 | Gwozdz | 88—16 |
|---|---|---|---|
| 2,374,854 | 5/1945 | Feinbloom | 88—20 |
| 2,441,031 | 5/1948 | Papritz | 88—20 |
| 3,071,040 | 1/1963 | Jayle | 88—20 |

FOREIGN PATENTS 1,057,488  10/1953  France.

OTHER REFERENCES

Patrick: A Projection Scotometer, The Optician, June 4, 1948, pages 489–490.

JEWELL H. PEDERSEN, *Primary Examiner.*